United States Patent
Wang et al.

(10) Patent No.: US 9,530,045 B2
(45) Date of Patent: Dec. 27, 2016

(54) METHOD, SYSTEM AND NON-TRANSITORY COMPUTER STORAGE MEDIUM FOR FACE DETECTION

(71) Applicant: Tencent Technology (Shenzhen) Company Limited, Shenzhen, Guangdong (CN)

(72) Inventors: Hui Wang, Shenzhen (CN); Xiaojing Xie, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 202 days.

(21) Appl. No.: 14/497,191

(22) Filed: Sep. 25, 2014

(65) Prior Publication Data

US 2015/0016687 A1    Jan. 15, 2015

Related U.S. Application Data

(63) Continuation of application No. PCT/CN2013/072518, filed on Mar. 13, 2013.

(30) Foreign Application Priority Data

Mar. 26, 2012 (CN) .......................... 2012 1 0082964

(51) Int. Cl.
    *G06K 9/00*    (2006.01)
(52) U.S. Cl.
    CPC ....... *G06K 9/00234* (2013.01); *G06K 9/00248* (2013.01); *G06K 9/00275* (2013.01); *G06K 9/00281* (2013.01)
(58) Field of Classification Search
    None
    See application file for complete search history.

(56) References Cited

U.S. PATENT DOCUMENTS

| 6,542,625 B1 | 4/2003 | Lee et al. |
| 2005/0063582 A1 | 3/2005 | Park et al. |
| 2005/0105770 A1* | 5/2005 | Sumitomo ............... G06K 9/48 382/103 |

FOREIGN PATENT DOCUMENTS

| CN | 101216882 | 7/2008 |
| CN | 101561710 | 10/2009 |

(Continued)

OTHER PUBLICATIONS

Non-Finial Office Action for Korean Patent Application No. 10-2014-7029988, mailed Feb. 11, 2016.

(Continued)

*Primary Examiner* — Atiba O Fitzpatrick
(74) *Attorney, Agent, or Firm* — Blakely Sokoloff Taylor & Zafman LLP (57) ABSTRACT

In a face detection method, preprocess an image, and extract corners from the preprocessed image. Then, filter and combine the corners to obtain a connected component for the corners. Extract a centroid from the connected component of the corners, and match the centroid with a facial template. Then, calculate a matching probability of the centroid with the facial template, and identify a region formed by centroids having a matching probability greater than or equal to a predetermined value as a candidate face region. With the method described above, the accuracy and efficiency of face detection can be improved. In addition, the present invention provides a face detection system and a computer storage medium.

21 Claims, 6 Drawing Sheets

(56) References Cited

FOREIGN PATENT DOCUMENTS

| CN | 102663354 | 9/2012 |
|---|---|---|
| JP | 2009-104427 | 5/2009 |
| KR | 10-2000-0050399 | 8/2000 |
| KR | 10-2011-0051714 | 5/2011 |
| RU | 2382407 | 2/2010 |

OTHER PUBLICATIONS

Non-Final Office Action for Russian Patent Application No. 2014142591, mailed Jan. 27, 2016.
Extended European Search Report for European Patent Application No. 13770054.8, mailed May 11, 2015.
First Examination Report for New Zealand Patent Application No. 701320, mailed Aug. 10, 2015.
First Office Action and Search Report for Chinese Patent Application No. 201210082964.6, mailed Apr. 1, 2013.
International Preliminary Report on Patentability for International Application No. PCT/CN2013/072518, mailed Oct. 1, 2014.
Ding, et al., "Facial Landmark Localization," Handbook of Face Recognition, Second Edition, Li et al. eds., Springer-Verlag London Limited, (2011), pp. 305-322.
Lam et al., "Locating and Extracting the Eye in Human Face Images," Pattern Recognition, vol. 29, No. 5, (1996), pp. 771-779.
Lee et al., "An effective method for detecting facial features and face in human-robot interaction," Informational Sciences, Amsterdam, NL, vol. 176, No. 21, (Nov. 3, 2006), pp. 3166-3189.
Lee et al., "Novel Pose-Variant Face Detection Method for Human Robot Interaction Application," Conference on Machine Vision Applications, May 16-18, 2005, Tsukuba Science City, Japan, pp. 281-284.
Yang et al., "Detecting Faces in Images: A Survey," IEEE Transactions on Pattern Analysis and Machine Intelligence, vol. 24, No. 1, (Jan. 2002), pp. 34-58.
Yow et al., "Feature-based human face detection," Image and Vision Computing, vol. 15, (1997), pp. 713-735.
International Search Report for PCT International Application No. PCT/CN2013/072518, mailed Jun. 13, 2013.
Lu Xujun et al., "A Method Using Skin-Color and Template for Automatic Face Detection," *Computer Applications and Software*, vol. 28, No. 7, Jul. 28, 2011, pp. 112-114 and 140.

* cited by examiner

| A3 | B | B2 |
|----|---|----|
| A1 | C | A  |
| B3 | B1| A2 |

| p1 | p2 | p3 |
|----|----|----|
| p4 | p5 | p6 |
| p7 | p8 | p9 |

METHOD, SYSTEM AND NON-TRANSITORY COMPUTER STORAGE MEDIUM FOR FACE DETECTION

CROSS-REFERENCE TO RELATED APPLICATIONS

The present application is a continuation of International Application No. PCT/CN2013/072518, filed Mar. 13, 2013, which claims priority of Chinese Patent Application No. 201210082964.6, filed Mar. 26, 2012, the disclosures of both of which are incorporated herein by reference in their entireties.

FIELD OF THE INVENTION

The present invention relates to face detection technology, and more particularly, to a method and system for face detection and a corresponding computer storage medium.

BACKGROUND OF THE INVENTION

Face detection is widely used in various face recognition-based devices. The accuracy of face detection is essential for face recognition. With the continuous development of communication technologies, more and more portable communication devices also have a face recognition function, for example, a face recognition and smile capture of a digital camera, a face unlocking of a mobile device, or the like.

In current face recognition, a lot of training samples are required for face detection, and detecting the face requires a large number of computations, which makes the algorithm inefficient, have less accuracy, and unable to meet the massive data processing requirements.

SUMMARY OF THE INVENTION

In light of the above, there is a need to provide a face detection method which can improve efficiency and accuracy.

The method for detecting a face includes: preprocessing an image; extracting corners from the preprocessed image, and filtering and combining the corners, to obtain a connected component of the corners; extracting centroids from the connected component of the corners; and matching the centroids with a facial template, calculating a matching probability of the centroids with the facial template, and identifying regions formed by centroids having a matching probability greater than or equal to a predetermined value as candidate face regions.

In an embodiment, the preprocessing includes at least one of image level adjustment, auto white balance, normalization and image mosaicing.

In an embodiment, extracting the corners from the preprocessed image includes: calculating luminance differences between a current pixel and surrounding pixels based on a predefined 3×3 template; and deriving a pixel having a luminance difference greater than or equal to a first threshold as the corner; wherein the 3×3 template is a region centered on the current pixel and including pixels to the left, right, upper, lower, top-left, top-right, bottom-left and bottom-right of the current pixel.

In an embodiment, filtering the corners includes: identifying skin color points in the preprocessed image, and filtering out the corners which do not include a skin color point in a preset surrounding range; and extracting the center of the intersection of a YcgCr color space and a YcbCr color space as a skin color center, calculating values of components Cb, Cg and Cr of the corners, calculating distances between the skin color center and the values of the components Cb, Cg and Cr of the corners, and filtering out the corners having a distance greater than a second threshold from the skin color center.

In an embodiment, extracting the centroids from the connected component of the corners includes: selecting a connected component having an area greater than or equal to a third threshold and/or having an aspect ratio within a preset range; extracting a center of the selected connected component as a centroid; and calculating a direction of the extracted centroid, and removing the centroid when the perpendicularity of the direction is within a set perpendicularity range.

In an embodiment, the facial template is a rectangular template including a left eye vertex, a right eye vertex, and at least one third point located on another line parallel with a line where the left eye vertex and the right eye vertex are located.

In an embodiment, matching the centroids with the facial template, calculating the matching probability of the centroids with the facial template, and identifying the region formed by the centroids having a matching probability greater than or equal to the predetermined value as the candidate face region includes: traversing the centroids; and for each of the centroids, performing the following steps:

searching a second centroid having a distance to the right eye vertex less than or equal to a fourth threshold using a first centroid as a vertex of the facial template; searching a third centroid having a vertical distance less than or equal to the fourth threshold from another line parallel with a line where the left eye vertex and the right eye vertex are located; calculating the matching probability based on the distance between the second centroid and the right eye vertex, the vertical distance between the third centroid and the another line, and the shortest distance between the third centroid and the third point; and determining whether the matching probability is greater than or equal to the predetermined value, and identifying a region formed by the first centroid, the second centroid and the third centroid as the candidate face region if the matching probability is greater than or equal to the predetermined value.

In an embodiment, the method further includes: after matching the centroids with the facial template, calculating the matching probability of the centroids with the facial template, and identifying the region formed by the centroids having a matching probability greater than or equal to the predetermined value as the candidate face region, dividing the candidate face region into a set amount of grids, and calculating a skin color proportion of each of the grids; and selecting a candidate face region which has a skin color proportion meeting a preset skin color proportional distribution as a final face region.

Additionally, there is a need to provide a face detection system which can improve efficiency and accuracy.

The system for detecting a face includes: a preprocessing module, used to preprocess an image; a corner extracting module, used to extract corners from the preprocessed image; a corner filtering and combining module, used to filter and combine the corners to obtain a connected component for the corners; a centroid extracting module, used to extract a centroid from the connected component of the corners; and a candidate face region determining module, used to match the centroids with a facial template, calculate a matching probability of the centroids with the facial template, and identify regions formed by the centroids having a matching probability greater than or equal to a predetermined value as candidate face regions.

In an embodiment, the preprocessing includes at least one of image level adjustment, auto white balance, normalization and image mosaicing.

In an embodiment, the corner extracting module is used to calculate a luminance difference between a current pixel and surrounding pixels based on a predefined 3×3 template, and extract the pixel having the luminance difference greater than or equal to a first threshold as the corner; wherein the 3×3 template is a region having the current pixel as a center and including pixels to the left, right, upper, lower, top-left, top-right, bottom-left and bottom-right of the current pixel.

In an embodiment, the corner filtering and combining module is used to identify skin color points in the preprocessed image, and filter out the corners which do not include a skin color point in a preset surrounding range; and the corner filtering and combining module is further used to extract the center of the intersection of a YcgCr color space and a YcbCr color space as a skin color center, calculate values of components Cb, Cg and Cr of the corners, calculate distances between the values of the components Cb, Cg and Cr of the corners and the skin color center, and filter out corners having a distance from the skin color center greater than a second threshold.

In an embodiment, the centroid extracting module includes: a connected component selecting unit, used to select a connected component having an area greater than or equal to a third threshold and/or having an aspect ratio within a preset range; a centroid extracting unit, used to extract a center of the selected connected component as a centroid; a centroid removing unit, used to calculate a direction of the extracted centroid, and remove the centroid when the direction has a perpendicularity within a set perpendicularity range.

In an embodiment, the facial template is a rectangular template including a left eye vertex, a right eye vertex, and at least one third point located on another line parallel with a line where the left eye vertex and the right eye vertex are located.

In an embodiment, the candidate face region determining module includes: a searching unit, used to, for each centroid, search a second centroid having a distance less than or equal to a fourth threshold from the right eye vertex using a first centroid to act as a vertex of the facial template, and search a third centroid having a vertical distance less than or equal to the fourth threshold from another line parallel with a line of the left eye vertex and the right eye vertex; a matching probability calculating unit, used to calculate the matching probability based on the distance between the second centroid and the right eye vertex, the vertical distance between the third centroid and the another line, and the shortest distance between the third centroid and the third point; and a region locating unit, used to determine whether the matching probability is greater than or equal to the predetermined value, and locate regions formed by the first centroid, the second centroid and the third centroid as the candidate face regions if the matching probability is greater than or equal to the predetermined value.

In an embodiment, the system further includes: a region selecting module, used to divide the candidate face regions into a set amount of grids, calculate a skin color proportion of each of the grids, and select a candidate face region which has a skin color proportion meeting a preset skin color proportional distribution as a final face region.

Additionally, there is a need to provide a computer storage medium which can improve efficiency and accuracy.

The computer storage medium includes computer executable instructions for performing a method for detecting a face, wherein the method includes: preprocessing an image; extracting corners from the preprocessed image, and filtering and combining the corners, to obtain a connected component of the corners; extracting centroids from the connected component of the corners; and matching the centroids with a facial template, calculating a matching probability of the centroids with the facial template, and identifying regions formed by centroids having a matching probability greater than or equal to a predetermined value as candidate face regions.

In the face detection method and system, and the computer storage medium thereof described above, a matching probability of a centroid with a face template is calculated, and a region formed by centroids having a matching probability greater than or equal to a predetermined value is identified as a candidate face region. The probability model of such a face template may scale and rotate robustly, match a face more precisely, and provide an efficient algorithm. Thus, it is able to improve the efficiency and accuracy of face detection.

DETAILED DESCRIPTION OF THE INVENTION

Figure 1:
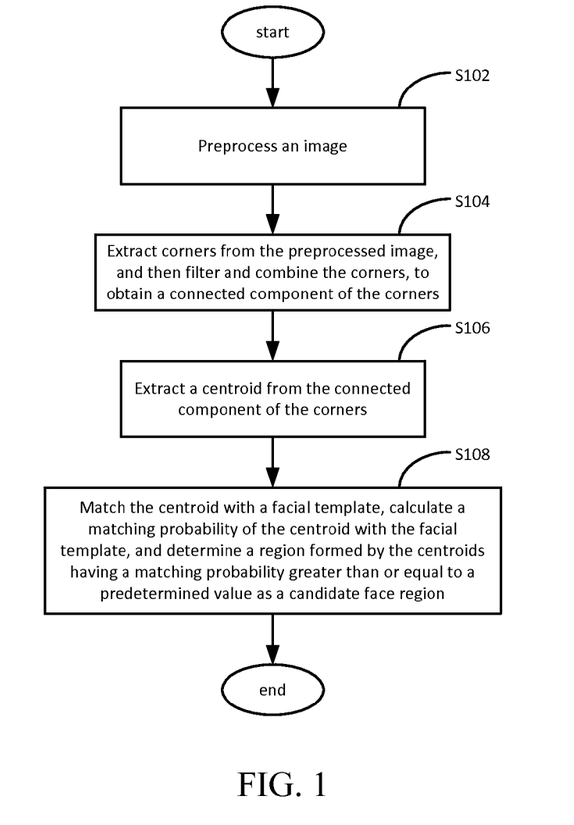
FIG. 1 is a schematic flow diagram of a face detection method in accordance with an embodiment.

As shown in FIG. 1, in an embodiment, a face detection method includes the following steps.

Step S102: Preprocess an image.

In particular, in an embodiment, the preprocessing on an image includes at least one of the following image processing: level adjustment, auto white balance, normalization and mosaic generation. After the preprocessing on the image, a subsequent computation load can be effectively reduced, and the identification efficiency is improved accordingly.

Step S104: Extract corners from the preprocessed image, and then filter and combine the corners. In this way, a connected component of the corners is acquired.

In an example, a corner refers to a point of an image around which luminance changes dramatically. The image formed by the extracted corners may be considered as a profile diagram. However, not all the corners extracted from the preprocessed image are desired corners of facial features. Thus, the corners may be filtered, and those not related to determining positions of the facial features are removed. Due to the fact that the filtered corners, such as the corners of eyes and a mouth, may be gathered locally, the locally gathered corners may be combined to obtain a connected component of corners.

Step S106: Extract a centroid from the connected component of corners.

A centroid is a center of the connected component of corners, which may effectively characterize the major feature parts of a face, including eyes, a nose, a mouth, etc. After the centroid is extracted, it can be used for a subsequent facial template matching.

Step S108: Match the centroid with a facial template, calculate a matching probability of the centroid with the facial template, and determine a region formed by the centroids having a matching probability greater than or equal to a predetermined value as a candidate face region.

In this embodiment, a probability model of such a facial template may zoom and rotate robustly, provide a more precise matching of a face, and make the algorithm efficient. Thus, it is able to improve the efficiency and accuracy of face detection.

In a preferred embodiment, the preprocessing on an image includes image level adjustment, auto white balance, normalization and image mosaic production.

The level adjustment of an image refers to an operation of adjusting a level of the image. A level is an index standard representing a luminous intensity of an image. The fullness and finesse of color of an image depend on the level. By adjusting the level of an image, the intensity level of shadows, midtones and highlights of the image can be adjusted, thereby enhancing the visual effect of the image to a certain extent.

Figure 2:
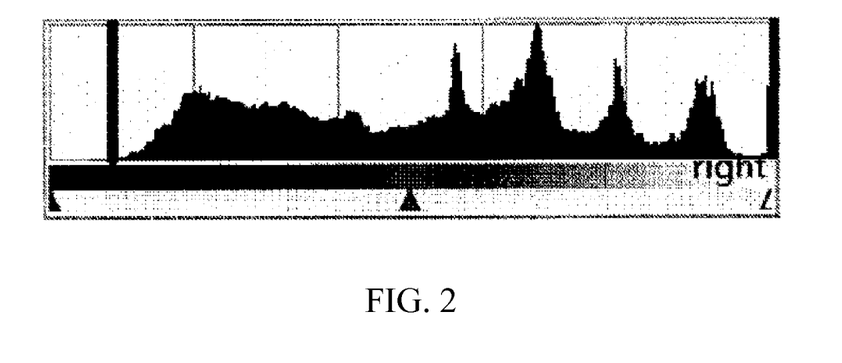
FIG. 2 is a histogram of R channel of an image.

In an embodiment, levels of three channels (i.e., RGB channels) of an image can be adjusted, respectively. FIG. 2 is a histogram of R channel of a certain image. The shadow regions and highlight regions which include less data may be removed, and the left and right boundaries are adjusted to fall within an interval [left, right]. Then, the values on R channel are remapped back to an interval [0, 255]. The interval [left, right] is the remaining level information after the shadow regions and highlight regions are removed.

In particular, a new R/G/B value can be calculated according to the following formula.

Diff=right−left new$RGB$=(old$RGB$−left)*255/Diff

In the formula, newRGB is a new R/G/B value, and oldRGB is an R/G/B value before the level adjustment.

In this embodiment, the level adjustment may improve the image contrast and make edges clearer, which is more conducive to the subsequent skin color recognition, corner filtering, etc.

The auto white balance is used for solving the problem of color shift. Since in actual photographing, the limitations on shooting environments of devices such as a mobile terminal, and the limitations on devices themselves such as a camera may lead to inaccurate exposure, which will in turn result in a significant color shift or a serious lack of part of colors. The color shift or serious lack of part of colors would affect the subsequent skin color region extraction, hence there is a need to perform the auto white balance.

In an embodiment, the auto white balance can be performed according to:

$$R' = \frac{G_{ave}}{R_{ave}} R, \; G' = G, \; B' = \frac{G_{ave}}{B_{ave}} B,$$

wherein R', G' and B' are three component values of the image after the auto white balance is performed, and R, G and B are three component values of the original image. Also, $R_{ave}$, $G_{ave}$ and $B_{ave}$ are averages of R, G and B components of the image, respectively.

Since images having different size may have different parameters in the subsequent corner extracting, particle extracting, corner combining and filtering or other processing steps, the size of the images can be normalized. That is, scaling is carried out on the images in order to unify the parameters used in the subsequent processing processes.

In an embodiment, an image can be scaled with an original proportion or with a proportion other than the original proportion. Preferably, an image is scaled with the original proportion. For example, an image having a height greater than 400 px may be narrowed to an image having a height of 400 px with an original aspect ratio, and an image having a height smaller than 400 px remains unchanged without amplification.

Since some images have a wide edge of such as more than one pixel, if corners are extracted directly on the pixel level, a large number of corners desired may be missing. In a preferred embodiment, a mosaic processing may be performed on an image after normalization to convert the image into a mosaic image, which enables a more accurate extraction of corners. Meanwhile, the extraction of corners on the mosaic image can also greatly enhance the processing speed. For example, on a scale of 400 px, the size of a mosaic may be selected as 2×2 px, and a new pixel value is an average of these four pixels.

Figure 3:
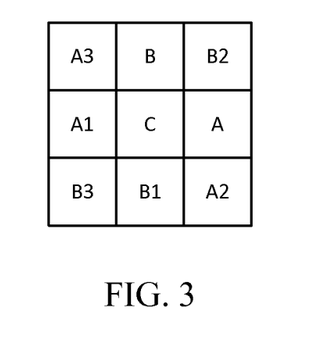
FIG. 3 is a schematic diagram of a 3×3 template in accordance with an embodiment.

In an embodiment, the specific process of extracting corners from the preprocessed image in Step S104 is as follows: calculating a luminance difference between a current pixel and surrounding pixels based on a predefined 3×3 template, and extracting a pixel having a luminance difference greater than or equal to a first threshold as a corner. Herein, the 3×3 template is a region centered on the current pixel and also formed by the pixels to the left, right, upper, lower, top-left, top-right, bottom-left and bottom-right of the current pixel.

As shown in FIG. 3, a current pixel is C, and pixels to the left, right, upper, lower, top-left, top-right, bottom-left and bottom-right of the current pixel are A1, A, B, B1, A3, B2, B3 and A2, respectively. A region formed by these nine pixels is the predefined 3×3 template. In particular, in an embodiment, for each pixel (i.e., the current pixel) of the preprocessed image, calculate a luminance difference between the current pixel and its surrounding pixels according to the following formula.

Definition:

$rA1 = w1*(fA-fC)^2 + w1*(fA1-fC)^2$ $rB1 = w2*(fB-fC)^2 + w2*(fB1-fC)^2$ $R1 = \min(rA1, rB1)$ $$rA2 = w3*(fA2-fC)^2 + w3*(fA3-fC)^2$$

$$rB2 = w4*(fB2-fC)^2 + w4*(fB3-fC)^2$$

$$R2 = \min(rA2, rB2)$$

In the formula, f represents a luminance component (0~255) of the pixel. For example, fA represents a luminance of pixel A on the right of point C, w1, w2, w3 and w4 are weights, which may be w1=w2=1 and w3=w4=1. If R1 and R2 are both smaller than a given threshold T1 (such as T1=200), then the point (i.e., the current pixel) is not a corner. Otherwise, perform a calculation according to the following formula.

$$B1 = w5*(fB-fA) \times (fA-fC) + w5*(fB1-fA1) \times (fA1-fC)$$

$$B2 = w6*(fB-fA1) \times (fA1-fC) + w6*(fB1-fA) \times (fA-fC)$$

$$B3 = w7*(fB2-fA2) \times (fA2-fC) + w7*(fB3-fA3) \times (fA3-fC)$$

$$B4 = w8*(fB2-fA3) \times (fA3-fC) + w8*(fB3-fA2) \times (fA2-fC)$$

$$mB1 = \min(B1, B2)$$

$$mB2 = \min(B3, B4)$$

$$A1 = rB1 - rA1 - 2 \times mB1$$

$$A2 = rB2 - rA2 - 2 \times mB2$$

$$R1 = rA1 - mB1^2/A1, \text{ when } mB1<0 \text{ and } A1+mB1>0$$

$$R2 = rA2 - mB2^2/A2, \text{ when } mB2<0 \text{ and } A2+mB2>0$$

In the formula, W5, W6, W7 and W8 are weights, which can take W5=W6=1 and W7=W8=1. The final calculated R1 and R2 are luminance differences between the current pixel and the surrounding pixels. If R1 and R2 are both smaller than a given threshold T2 (such as T2=700), then the point (i.e., the current pixel) is not a corner. Otherwise, it means that the point has a dramatic luminance change around it in the image, and the point is a corner.

In an embodiment, procedures of filtering corners in Step S104 are as follows: identifying skin color points in the preprocessed image; filtering out the corners which do not include the skin color points within a preset surrounding range; extracting a center of the intersection of a YCgCr color space and a YCbCr color space as a skin color center; calculating values of components Cb, Cg and Cr of the corners, and calculating distances between the skin color center and the values of the components Cb, Cg and Cr of the corners; filtering out the corners having a distance greater than a second threshold from the skin color center. That is, in this embodiment, reserve a corner around which a skin color point exists, and remove a corner which is further away from a skin color point.

There are many color spaces available for skin detection, such as RGB, HSV, YCbCr, YUV, YCgCr, etc. In a preferred embodiment, simultaneous extraction of skin color from the YCbCr and YCgCr spaces may be performed, resulting in better extraction accuracy. In the YCgCr color space, there is a skin color range of $Cg \in [85, 135]$, $Cr \in [-Cg+260, -Cg+280]$. In the YCbCr color space, there is a skin color range of $Cb \in [77, 127]$, $Cr \in [133, 173]$. Meanwhile, in both color spaces, $Y \in [16, 235]$.

In particular, the components Y, Cb, Cr and Cg may be calculated based on RGB values of pixels in the preprocessed image according to the following formula.

$$\begin{bmatrix} Y \\ Cb \\ Cg \\ Cr \end{bmatrix} = \begin{bmatrix} 16 \\ 128 \\ 128 \\ 128 \end{bmatrix} + \begin{bmatrix} 65.481 & 128.553 & 24.966 \\ -37.797 & -74.203 & 112 \\ -81.085 & 112 & -30.915 \\ 112 & -93.786 & -18.214 \end{bmatrix} \begin{bmatrix} R \\ G \\ B \end{bmatrix}$$

If the calculated components Y, Cb, Cr and Cg satisfy the two skin color ranges described above, then the pixel is a skin color pixel (i.e., skin color point). If there is no skin color point within a preset range around the extracted corner, then the corner is filtered out.

In this embodiment, take a center (Pcr, Pcg, Pcb) of the intersection of the two color spaces of the image described above as the skin color center. For each of the pixels in the preprocessed image, its components Cb, Cr and Cg are calculated, then the Euclidean distance between the pixel and the skin color center is calculated. If the Euclidean distance between the color of the pixel and the skin color center is greater than the second threshold, then it is considered that the pixel is unlikely to be a skin color point, and the corner is filtered out.

In an embodiment, a binary image of corners may be obtained after the corners are filtered. However, the number of submission related to the extraction is too large, and performing the facial template matching directly based on the binary image of corners will cause a large amount of calculations. Due to the local gather of many corners, the adjacent corners may be combined to reduce the subsequent computational load.

In particular, a distance function may be predefined. When the distance between the adjacent corners satisfies a preset condition, the corners are combined. Traditional pixel labeling algorithm, run length connectivity algorithm and region growing algorithm may be used to combine adjacent corners, and the detailed description thereof will be omitted. After the corners are combined, a connected component of a plurality of corners is obtained.

Figure 4:
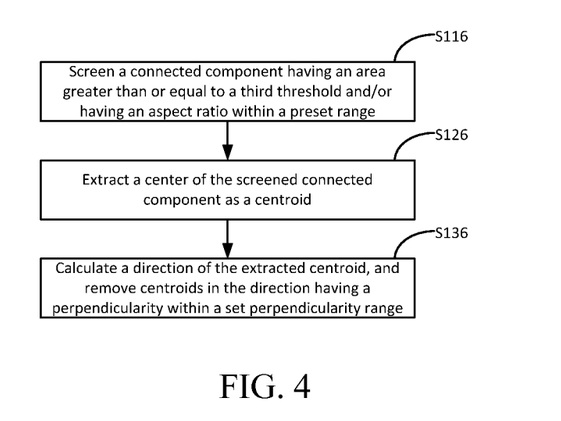
FIG. 4 is a schematic flow diagram of extracting a centroid from a connected component of corners in accordance with an embodiment.

As shown in FIG. 4, in an embodiment, the specific process of Step S106 is as follows.

Step S116: Screen a connected component having an area greater than or equal to a third threshold and/or having an aspect ratio within a preset range.

Since some of the resulting connected components of corners may not be in line with the characteristics of a face, the connected components of corners need to be filtered. In particular, connected components having an area smaller than the third threshold and/or having an aspect ratio out of a preset range may be removed. For example, the third threshold is set to 450, and then the connected component having an area greater than or equal to 450 is screened. The preset range may be that an aspect ratio must be greater than 0.5 and less than 5. Herein, the third threshold may be set based on the scale of the facial template to facilitate the subsequent facial template matching.

Step S126: Extract a center of the screened connected component as a centroid.

Step S136: Calculate a direction of the extracted centroid, and remove centroids in the direction having a perpendicularity within a set perpendicularity range.

In particular, a centroid is a vector, the direction of which is related to its position in the image. The direction of the centroid represents the edge trend information of the region where the centroid is located. Further, a traditional Sobel operator (which is an edge extraction operator) may be used to calculate the direction of the centroid, and remove a centroid in the direction which has a perpendicularity within a set perpendicularity range. That is, remove a centroid in the near vertical direction, which is a centroid extracted from a vertical edge. In this way, centroids that do not meet the perpendicularity condition may be filtered.

After Step S136 is performed, the resulting centroid can be used for facial template matching. In particular, each of the centroids can be represented as (P, R, D), wherein P is the center of the combined connected component, R is the radius of the connected component, and D is the density of the connected component.

In an embodiment, the facial template is a rectangular template including a left eye vertex, a right eye vertex, and at least a third point located on another line parallel with the line where the left eye vertex and the right eye vertex are located.

Figure 5:
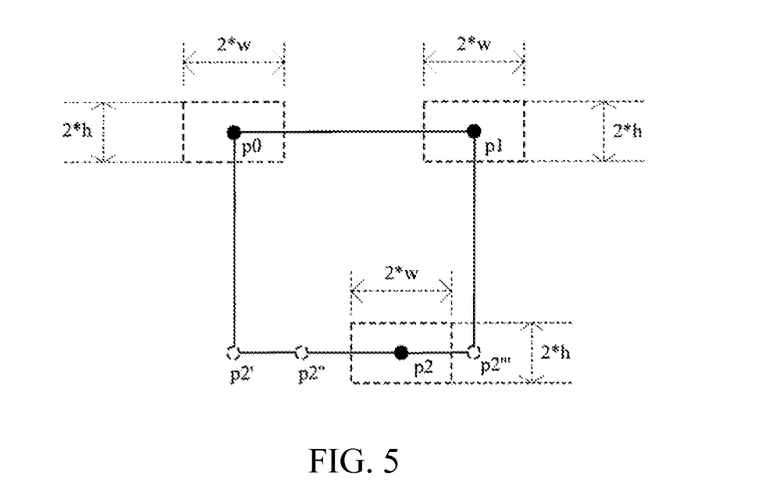
FIG. 5 is a schematic diagram of a facial template in accordance with an embodiment.

As shown in FIG. 5, the facial template is a rectangular template, including at least three points, each of the points is represented by (P, w, h). Herein, P is a two-dimensional coordinate of a point, W is a maximum allowed lateral extent around the point, and h is a maximum allowed longitudinal extent around the point. As shown in FIG. 5, a left eye vertex is p0, a right eye vertex is p1, and p2 is the third point. In FIG. 5, particles drawn by dotted lines represent possible positions of point p2 when p0 and p1 are determined.

Figure 6:
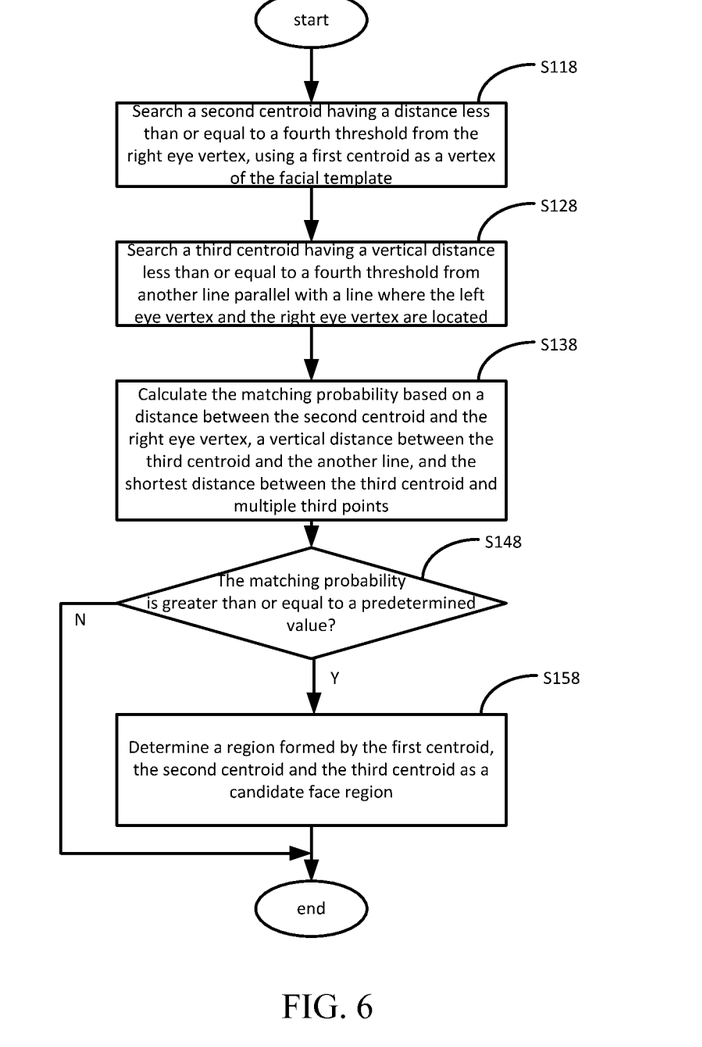
FIG. 6 is a schematic flow diagram of locating a candidate face region in accordance with an embodiment.

As shown in FIG. 6, in an embodiment, the specific process of Step S108 is as follows: traversing the centroids, and performing the following steps for each of the centroids.

Step S118: Search a second centroid having a distance less than or equal to a fourth threshold from the right eye vertex, using a first centroid as a vertex of the facial template. In an example, the first centroid may be selected from the centroids extracted.

Figure 7:
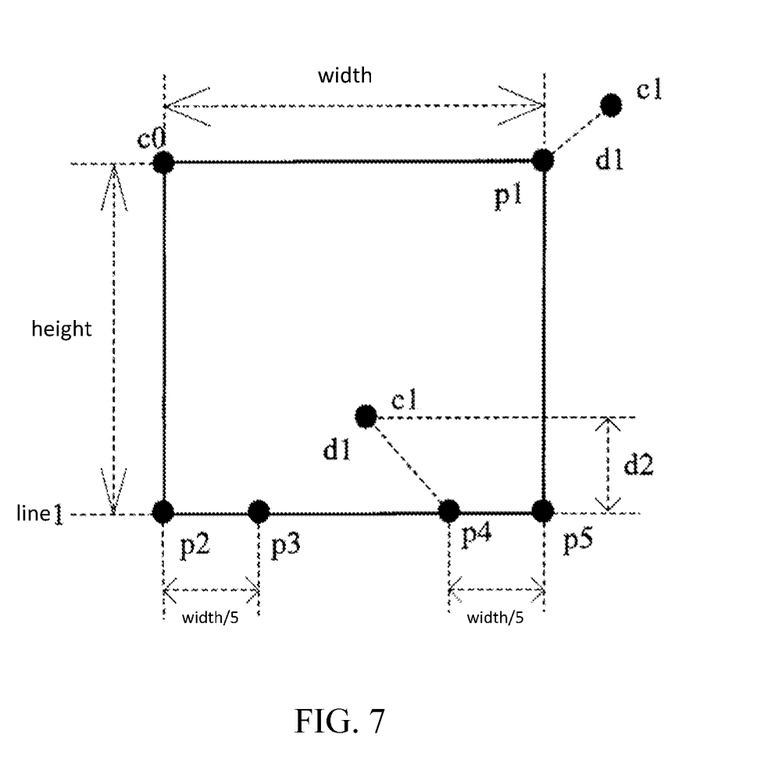
FIG. 7 is a schematic diagram of matching a centroid with a facial template in accordance with an embodiment.

Specifically, if the second centroid cannot be reached, then it indicates that the facial template is not matched. If the second centroid can be found, then Step S128 is performed. "Width" and "height" shown in FIG. 7 are a width and height of the facial template, and the searched second centroid is c1.

Step S128: Search a third centroid having a vertical distance less than or equal to a fourth threshold from another line parallel with a line where the left eye vertex and the right eye vertex are located.

In particular, if the third centroid cannot be found, then it means that the facial template is not matched. If the third centroid can be searched, then Step S138 is performed. As shown in FIG. 7, the searched third centroid is c2.

Step S138: Calculate the matching probability based on a distance between the second centroid and the right eye vertex, a vertical distance between the third centroid and the another line, and the shortest distance between the third centroid and multiple third points.

In particular, in an embodiment, a first probability may be calculated based on the distance between the second centroid and the right eye vertex after the second centroid is searched out. In conjunction with FIG. 7, the first probability may be calculated according to the following formula.

$$s1=1-d1/\text{threshold}$$

In this formula, s1 is the first probability, d1 is the distance between the second centroid c1 and the right eye vertex, and "threshold" is a fourth threshold.

After the third centroid is searched, a second probability may be calculated based on the vertical distance between the third centroid and the another line. In conjunction with FIG. 7, the second probability may be calculated according to the following formula.

$$s2=1-d2/\text{threshold}$$

In this formula, s2 is the second probability, d2 is the vertical distance between the third centroid c2 and the another line named "line1", and "threshold" is the fourth threshold.

After the third centroid c2 is searched, distances between the third centroid c2 and all of the third points of the facial template may be calculated, in order to acquire the shortest distance. As shown in FIG. 7, the shortest distance is distance d3 between the third centroid c2 and the third point p4. If d3 is greater than width/5, then it means that it is not a matching facial template. Otherwise, a third probability is further calculated based on the shortest distance between the third centroid and the third points. In particular, the following formula may be adopted for calculating the third probability.

$$s3=1-d3/(\text{width}/5)$$

In this formula, s3 is the third probability, d3 is the shortest distance, and "width" is a width of the facial template.

Further, the matching probability is calculated based on the three calculated probabilities. In an embodiment, the matching probability may be calculated according to the formula: p=3*s1+s2+s3.

Step S148: Determine whether the matching probability is greater than or equal to a predetermined value. If yes, then proceed to Step S158. Otherwise, the process ends.

For example, for a 250 px×250 px facial template, the fourth threshold may be set to 50 px, and the predetermined value is 0.8.

Step S158: Determine a region formed by the first centroid, the second centroid and the third centroid as a candidate face region.

As shown in FIG. 7, the region formed by the first centroid c0, the searched second centroid c1 and the searched third centroid c2 is located as a candidate face region.

It should be noted that, a variety of searching approaches may be employed to search a centroid. For example, a full search may be performed. That is, perform a calculation that treats each centroid as a vertex of the facial template. In order to improve search efficiency, a partial search can also be used which ignores some centroids that cannot meet the conditions during searching, thereby expediating the entire search process. For example, the centroid surrounded by a large-area dark region may obviously not be an initial position of the left eye; the oversized centroids in a vertical or horizontal arrangement may not exist in a region adjacent to the centroids of five sense organs; the centroids in a region close to the borders of the facial template are ignored; the centroids having a size approximate to that of the facial template and in an oval or arcuate arrangement are ignored.

In an embodiment, subsequent to Step S108, a region screening may be further performed on the candidate face regions, the specific process of which is as follows: dividing each of the candidate face regions into a set amount of grids, calculating a skin color proportion of each of the grids, and selecting a candidate face region which has a skin color proportion matching a preset skin color proportional distribution as a final face region.

Figure 8:
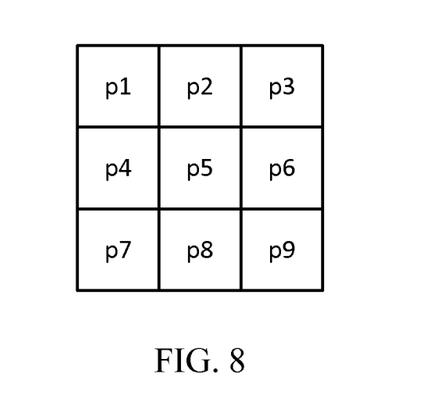
FIG. 8 is a schematic diagram of a skin color proportion model in accordance with an embodiment.

Due to the fact that some candidate face regions may not be real face regions, performing a region screening on the candidate face regions may further improve the accuracy of face location. In an embodiment, as shown in FIG. 8, a face region may be divided into 9 grids, and the skin color proportions in each of the grids are calculated, respectively. The skin color proportion is a proportion of pixels with skin color within the grid relative to all pixels in the grid. The skin color recognition method described above may be used to recognize a pixel with skin color, and the detailed description thereof will be omitted hereon.

In particular, as shown in FIG. 8, the skin color proportions in the grids are p1~p9, respectively, and thresholds T3 and T4 are set. When the skin color proportions meet the following conditions, the candidate face region may be determined as a final face region.

$$p1,p3,p4,p7,p8,p9>=T1$$

$$|p3-p1|<T2$$

$$|p6-p4|<T2$$

$$|p9-p7|<T2$$

wherein T1 may be set to 0.5, and T2 may be set to 0.5.

After the final face region is obtained, the position of the final face region in the image and the size of the final face region may be further obtained and output.

Figure 9:
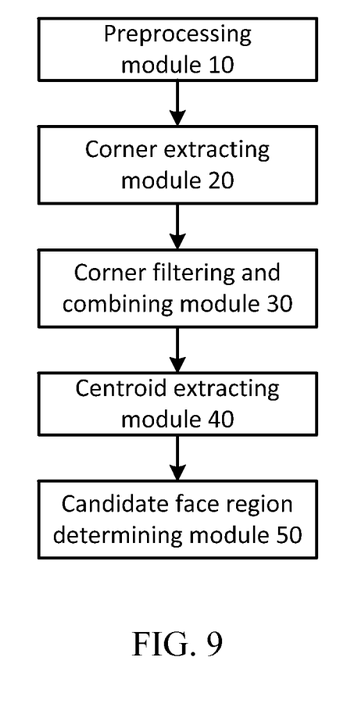
FIG. 9 is a structural block diagram of a face detection system in accordance with an embodiment.

As shown in FIG. 9, in an embodiment, a face detection system includes: memory, and one or more processors. The memory stores one or more program modules configured for execution by the one or more processors. The one or more program modules include: a preprocessing module 10, a corner extracting module 20, a corner filtering and combining module 30, a centroid extracting module 40, and a candidate face region determining module 50.

The preprocessing module 10 is used for performing a preprocessing on an image.

In particular, in an embodiment, the preprocessing on the image performed by the preprocessing module 10 includes at least one of image level adjustment, auto white balance, normalization and image mosaic. Preprocessing the image may effectively reduce the subsequent computation loads, and enhance identification efficiency.

The corner extracting module 20 is used for extracting corners from the preprocessed image.

The corner filtering and combining module 30 is used for filtering and combining the corners to obtain a connected component of the corners.

The centroid extracting module 40 is used for extracting centroids from the connected component of the corners.

The candidate face region determining module 50 is used for performing a matching between a centroid and a facial template, calculating a matching probability of the centroid with the facial template, and locating a region formed by the centroids having a matching probability greater than or equal to a predetermined value as a candidate face region.

In this embodiment, a probability model of such a facial template may extend and contract and rotate robustly, to more precisely match a face, which makes the algorithm efficient. Accordingly, it is able to improve the efficiency and accuracy of face detection.

In an embodiment, the corner extracting module 20 is used for calculating luminance differences between a current pixel and surrounding pixels based on a predefined 3×3 template, and extracting a pixel having a luminance difference greater than or equal to a first threshold as a corner. Herein, the 3×3 template is a region having the current pixel as a center and also formed by the pixels on the left, right, upper, lower, top-left, top-right, bottom-left and bottom-right of the current pixel.

In an embodiment, the corner filtering and combining module 30 is used for identifying skin color points in the preprocessed image, filtering out the corners which do not include a skin color point in a preset range around them, and extracting the center of the intersection of a YCgCr color space and a YCbCr color space as the skin color center, calculating values of components Cb, Cg and Cr of the corners and distances between the values of the components Cb, Cg and Cr of the corners and the skin color center, and filtering out the corners having a distance to the skin color center greater than a second threshold. In this embodiment, it is to reserve a corner around which a skin color point exists, and remove a corner which is further away from the skin color point.

In an embodiment, a binary image of corners may be obtained by filtering the corners. However, the number of submission related to the extraction is large at this stage, and performing the facial template matching directly on the binary image of corners may involve very extensive computations. Due to the local gather of corners, the adjacent corners may be combined to reduce subsequent computational loads.

In particular, the corner filtering and combining module 30 is used for predefining a distance function. When the distance between adjacent corners satisfies the preset condition, the corners are combined. Traditional pixel labeling algorithm, run length connectivity algorithm and region growing algorithm may be used to combine the adjacent corners, and the detailed description thereof may not be described repeatedly hereon. After the corners are combined, a connected component of a plurality of corners is obtained.

Figure 10:
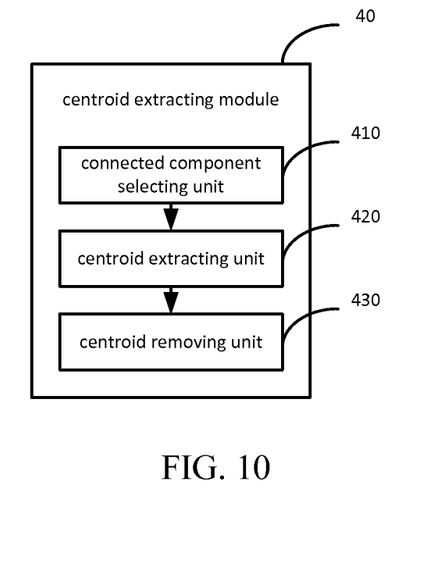
FIG. 10 is a structural block diagram of a centroid extracting module in accordance with an embodiment.

In an embodiment, as shown in FIG. 10, the centroid extracting module 40 includes a connected component selecting unit 410, a centroid extracting unit 420, and a centroid removing unit 430.

The connected component selecting unit 410 is used for selecting a connected component having an area greater than or equal to a third threshold and/or having an aspect ratio within a preset range.

The centroid extracting unit 420 is used for extracting the center from the selected connected component as a centroid.

The centroid removing unit 430 is used for calculating a direction of the extracted centroids, and removing a centroid in the direction having a perpendicularity within a set perpendicularity range.

In particular, a centroid is a vector, the direction of which is related to its position in the image. The direction of the centroid represents the edge trend information of the region thereof. Further, a traditional Sobel operator (an edge extraction operator) may be used by the centroid removing unit 430 to calculate the direction of the centroid. A centroid in the direction which has a perpendicularity within a set perpendicularity range is removed. That is, for a centroid in the near vertical direction, it is a centroid extracted from a vertical edge, which may be removed.

In an embodiment, the facial template is a rectangular template including a left eye vertex, a right eye vertex, and at least one third point located on another line parallel with the line of the left eye vertex and the right eye vertex.

Figure 11:
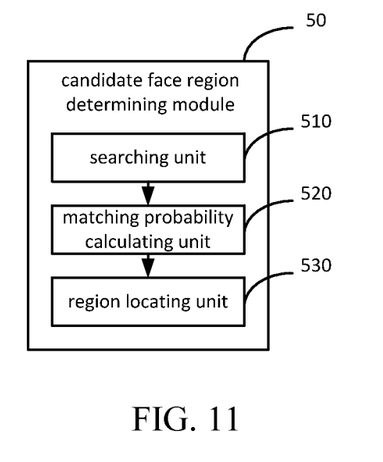
FIG. 11 is a structural block diagram of a candidate face region determining module in accordance with an embodiment.

As shown in FIG. 11, the candidate face region determining module 50 includes a searching unit 510, a matching probability calculating unit 520, and a region locating unit 530.

The searching unit 510 is used for searching a second centroid having a distance to the right eye vertex less than or equal to a fourth threshold with a first centroid as a vertex of the facial template. In an example, the first centroid may be a centroid extracted by the centroid extracting module 40. The searching unit 510 is further used for searching the third centroid having a vertical distance less than or equal to a fourth threshold from another line parallel with the line of the left eye vertex and the right eye vertex.

The matching probability calculating unit 520 is used for calculating the matching probability based on the distance between the second centroid and the right eye vertex, the vertical distance between the third centroid and the another line, and the shortest distance between the third centroid and the third point.

The region locating unit 530 is used for determining whether the matching probability is greater than or equal to the predetermined value, and locating the region formed by the first centroid, the second centroid and the third centroid as the candidate face region if the matching probability is greater than or equal to the predetermined value.

In an embodiment, when searching a centroid, the searching unit may use a variety of searching approaches. For example, a full search may be performed, that is, perform a calculation that treats each centroid as a vertex of the facial template. In order to improve search efficiency, a partial search can also be used, that is, ignore some centroids which do not meet the conditions in the searching process, thereby speeding up the entire search process. For example, the centroids surrounded by a large-area dark region may obviously not be an initial left eye position; the oversized centroids in a vertical or horizontal arrangement may not exist in a region adjacent to the centroids of five sense organs; the centroids in a region close to the borders of the facial template are ignored; the centroids having a size approximate to that of the template and in an oval or arcuate arrangement are ignored.

Figure 12:
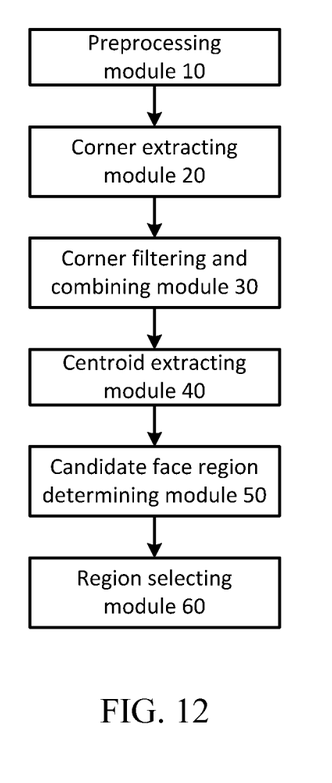
FIG. 12 is a structural block diagram of a face detection system in accordance with another embodiment.

As shown in FIG. 12, in another embodiment, a face detection system further includes a region selecting module 60.

The region selecting module 60 is used for dividing the candidate face regions into a set amount of grids, calculating a skin color proportion of each of the grids, and selecting a candidate face region which has a skin color proportion meeting a preset skin color proportional distribution as a final face region.

Due to the fact that some candidate face regions may not be real face regions, performing region screening on the candidate face regions may further improve the accuracy of face location. In an embodiment, as shown in FIG. 8, a face region may be divided into 9 grids, and skin color proportions in each of the grids are calculated, respectively. The skin color proportion is a proportion of skin color pixels in the grid relative to all pixels of the grid. The skin color recognition method described above may be used to recognize a skin color pixel, and the detailed description thereof will be omitted hereon.

After the final face region is obtained, the region selecting module 60 is further used for obtaining and outputting the position of the final face region in the image and the size of the final face region.

It should be noted that, the face detection method and system described above may be used in a variety of face recognition applications. Compared with traditional detection algorithms, the method and system for detecting faces described above can mark a face region more accurately and be implemented more efficiently, which is able to adapt to massive data processing.

In addition, the present invention further provides one or more computer storage medium including computer-executable instructions for performing a face detection method. The specific steps of the face detection method implemented by the computer-executable instructions included in the computer storage medium are described above, and the detailed description thereof will be omitted.

Although several embodiments of the present invention have been described in detail, it is not intended to be considered as limiting the scope of the invention. It should be noted that, a number of variations and improvements may be made by those skilled in the art without departing from the concept of the present invention, which fall within the scope of the present invention. Thus, the scope of the present invention should be determined by the appended claims.

The invention claimed is:

1. A method for detecting a face, comprising:
   preprocessing an image;
   extracting corners from the preprocessed image, and filtering and combining the corners, to obtain a connected component of the corners;
   extracting centroids from the connected component of the corners; and
   matching the centroids with a facial template, calculating a matching probability of the centroids with the facial template, and identifying regions formed by centroids having a matching probability greater than or equal to a predetermined value as candidate face regions;
   wherein extracting the centroids from the connected component of the corners comprises:
   selecting a connected component having an area greater than or equal to a third threshold and/or having an aspect ratio within a preset range;
   extracting a center of the selected connected component as a centroid; and
   calculating a direction of the extracted centroid, and removing the centroid when the perpendicularity of the direction is within a set perpendicularity range.

2. The method according to claim 1, wherein the preprocessing comprises at least one of image level adjustment, auto white balance, normalization and image mosaic.

3. The method according to claim 1, wherein extracting the corners from the preprocessed image comprises:
   calculating luminance differences between a current pixel and surrounding pixels based on a predefined 3×3 template; and
   deriving a pixel having a luminance difference greater than or equal to a first threshold as the corner;
   wherein the 3×3 template is a region centered on the current pixel and including pixels to the left, right, upper, lower, top-left, top-right, bottom-left and bottom-right of the current pixel.

4. The method according to claim 1, wherein filtering the corners comprises:
   identifying skin color points in the preprocessed image, and filtering out the corners which do not include a skin color point in a preset surrounding range; and
   extracting the center of the intersection of a YcgCr color space and a YcbCr color space as a skin color center, calculating values of components Cb, Cg and Cr of the corners, calculating distances between the skin color center and the values of the components Cb, Cg and Cr of the corners, and filtering out the corners having a distance greater than a second threshold from the skin color center.

5. The method according to claim 1, wherein the facial template is a rectangular template including a left eye vertex, a right eye vertex, and at least one third point located on another line parallel with a line where the left eye vertex and the right eye vertex are located.

6. The method according to claim 5, wherein matching the centroids with the facial template, calculating the matching probability of the centroids with the facial template, and identifying the region formed by the centroids having a matching probability greater than or equal to the predetermined value as the candidate face region comprises:
  traversing the centroids; and
  for each of the centroids, performing the following steps:
    searching a second centroid having a distance to the right eye vertex less than or equal to a fourth threshold using a first centroid as a vertex of the facial template;
    searching a third centroid having a vertical distance less than or equal to the fourth threshold from another line parallel with a line where the left eye vertex and the right eye vertex are located;
    calculating the matching probability based on the distance between the second centroid and the right eye vertex, the vertical distance between the third centroid and the another line, and the shortest distance between the third centroid and the third point; and
    determining whether the matching probability is greater than or equal to the predetermined value, and identifying a region formed by the first centroid, the second centroid and the third centroid as the candidate face region if the matching probability is greater than or equal to the predetermined value.

7. The method according to claim 1, further comprising:
  after matching the centroids with the facial template, calculating the matching probability of the centroids with the facial template, and identifying the region formed by the centroids having a matching probability greater than or equal to the predetermined value as the candidate face region,
  dividing the candidate face region into a set amount of grids, and calculating a skin color proportion of each of the grids; and
  selecting a candidate face region which has a skin color proportion meeting a preset skin color proportional distribution as a final face region.

8. A system for detecting a face, comprising:
  memory, and one or more processors;
  the memory stores one or more program modules configured for execution by the one or more processors;
  wherein the one or more program modules comprise:
    a preprocessing module, configured to preprocess an image;
    a corner extracting module, configured to extract corners from the preprocessed image;
    a corner filtering and combining module, configured to filter and combine the corners to obtain a connected component for the corners;
    a centroid extracting module, configured to extract a centroid from the connected component of the corners; and
    a candidate face region determining module, configured to match the centroids with a facial template, calculate a matching probability of the centroids with the facial template, and identify regions formed by the centroids having a matching probability greater than or equal to a predetermined value as candidate face regions;
  wherein the centroid extracting module comprises:
    a connected component selecting unit, configured to select a connected component having an area greater than or equal to a third threshold and/or having an aspect ratio within a preset range;
    a centroid extracting unit, configured to extract a center of the selected connected component as a centroid;
    a centroid removing unit, configured to calculate a direction of the extracted centroid, and remove the centroid when the direction has a perpendicularity within a set perpendicularity range.

9. The system according to claim 8, wherein the preprocessing comprises at least one of image level adjustment, auto white balance, normalization and image mosaicing.

10. The system according to claim 8, wherein the corner extracting module is configured to calculate a luminance difference between a current pixel and surrounding pixels based on a predefined 3×3 template, and extract the pixel having the luminance difference greater than or equal to a first threshold as the corner;
  wherein the 3×3 template is a region having the current pixel as a center and including pixels to the left, right, upper, lower, top-left, top-right, bottom-left and bottom-right of the current pixel.

11. The system according to claim 8, wherein the corner filtering and combining module is configured to identify skin color points in the preprocessed image, and filter out the corners which do not include a skin color point in a preset surrounding range; and
  the corner filtering and combining module is further configured to extract the center of the intersection of a YcgCr color space and a YcbCr color space as a skin color center, calculate values of components Cb, Cg and Cr of the corners, calculate distances between the values of the components Cb, Cg and Cr of the corners and the skin color center, and filter out corners having a distance from the skin color center greater than a second threshold.

12. The system according to claim 8, wherein the facial template is a rectangular template including a left eye vertex, a right eye vertex, and at least one third point located on another line parallel with a line where the left eye vertex and the right eye vertex are located.

13. The system according to claim 12, wherein the candidate face region determining module comprises:
  a searching unit, configured to take each centroid as a first centroid, search a second centroid having a distance less than or equal to a fourth threshold from the right eye vertex using the first centroid to act as a vertex of the facial template, and search a third centroid having a vertical distance less than or equal to the fourth threshold from another line parallel with a line of the left eye vertex and the right eye vertex;
  a matching probability calculating unit, configured to calculate the matching probability based on the distance between the second centroid and the right eye vertex, the vertical distance between the third centroid and the another line, and the shortest distance between the third centroid and the third point; and
  a region locating unit, configured to determine whether the matching probability is greater than or equal to the predetermined value, and locate regions formed by the first centroid, the second centroid and the third centroid as the candidate face regions if the matching probability is greater than or equal to the predetermined value.

14. The system according to claim 8, further comprising:
  a region selecting module, configured to divide the candidate face regions into a set amount of grids, calculate a skin color proportion of each of the grids, and select a candidate face region which has a skin color proportion meeting a skin color proportional distribution as a final face region.

15. A non-transitory computer storage medium comprising computer executable instructions for performing a method for detecting a face, wherein the method comprises:
preprocessing an image;
extracting corners from the preprocessed image, and filtering and combining the corners, to obtain a connected component of the corners;
extracting centroids from the connected component of the corners; and
matching the centroids with a facial template, calculating a matching probability of the centroids with the facial template, and identifying regions formed by centroids having a matching probability greater than or equal to a predetermined value as candidate face regions;
wherein extracting the centroids from the connected component of the corners comprises:
selecting a connected component having an area greater than or equal to a third threshold and/or having an aspect ratio within a preset range;
extracting a center of the selected connected component as a centroid; and
calculating a direction of the extracted centroid, and removing the centroid when the perpendicularity of the direction is within a set perpendicularity range.

16. The non-transitory computer storage medium according to claim 15, wherein the preprocessing comprises at least one of image level adjustment, auto white balance, normalization and image mosaicing.

17. The non-transitory computer storage medium according to claim 15, wherein extracting the corners from the preprocessed image comprises:
calculating luminance differences between a current pixel and surrounding pixels based on a predefined 3×3 template; and
deriving a pixel having a luminance difference greater than or equal to a first threshold as the corner;
wherein the 3×3 template is a region centered on the current pixel and including pixels to the left, right, upper, lower, top-left, top-right, bottom-left and bottom-right of the current pixel.

18. The non-transitory computer storage medium according to claim 15, wherein filtering the corners comprises:
identifying skin color points in the preprocessed image, and filtering out the corners which do not include a skin color point in a preset surrounding range; and
extracting the center of the intersection of a YcgCr color space and a YcbCr color space as a skin color center, calculating values of components Cb, Cg and Cr of the corners, calculating distances between the skin color center and the values of the components Cb, Cg and Cr of the corners, and filtering out the corners having a distance greater than a second threshold from the skin color center.

19. The non-transitory computer storage medium according to claim 15, wherein the facial template is a rectangular template including a left eye vertex, a right eye vertex, and at least one third point located on another line parallel with a line where the left eye vertex and the right eye vertex are located.

20. The non-transitory computer storage medium according to claim 19, wherein matching the centroids with the facial template, calculating the matching probability of the centroids with the facial template, and identifying the region formed by the centroids having a matching probability greater than or equal to the predetermined value as the candidate face region comprises:
traversing the centroids; and
for each of the centroids, performing the following steps:
searching a second centroid having a distance to the right eye vertex less than or equal to a fourth threshold using a first centroid as a vertex of the facial template;
searching a third centroid having a vertical distance less than or equal to the fourth threshold from another line parallel with a line where the left eye vertex and the right eye vertex are located;
calculating the matching probability based on the distance between the second centroid and the right eye vertex, the vertical distance between the third centroid and the another line, and the shortest distance between the third centroid and the third point; and
determining whether the matching probability is greater than or equal to the predetermined value, and identifying a region formed by the first centroid, the second centroid and the third centroid as the candidate face region if the matching probability is greater than or equal to the predetermined value.

21. The non-transitory computer storage medium according to claim 15, further comprising:
after matching the centroids with the facial template, calculating the matching probability of the centroids with the facial template, and identifying the region formed by the centroids having a matching probability greater than or equal to the predetermined value as the candidate face region,
dividing the candidate face region into a set amount of grids, and calculating a skin color proportion of each of the grids; and
selecting a candidate face region which has a skin color proportion meeting a preset skin color proportional distribution as a final face region.

* * * * *